United States Patent [19]

Johnson, Jr. et al.

[11] 3,846,831

[45] Nov. 5, 1974

[54] SOUND REPRODUCING APPARATUS IN WHICH THE DRIVE MEANS OPERATES IN RESPONSE TO A PRERECORDED CONTROL SIGNAL

[75] Inventors: Clark E. Johnson, Jr., Weston; Peter L. Richman, Lexington, both of Mass.

[73] Assignee: Micro Communications Corporation, Waltham, Mass.

[22] Filed: Mar. 7, 1973

[21] Appl. No.: 338,733

[52] U.S. Cl. .......................... 360/74, 360/72, 360/84

[51] Int. Cl.. G11b 27/22, G11b 23/18, G11b 23/16

[58] Field of Search ........... 179/100.2 S, 100.2 MD, 179/100.1 VC; 35/35 C; 360/74, 72, 84

[56] References Cited

UNITED STATES PATENTS

| | | | |
|---|---|---|---|
| 3,334,194 | 8/1967 | Chang | 179/100.2 S |
| 3,405,461 | 10/1968 | Joslow | 179/100.2 S |
| 3,590,167 | 6/1971 | Price, Jr. et al. | 179/100.2 MD |
| 3,623,039 | 11/1971 | Barham | 179/100.2 S |
| 3,624,308 | 11/1971 | Kozu | 179/100.2 S |
| 3,678,221 | 7/1972 | Miller | 179/100.2 S |
| 3,702,908 | 11/1972 | Sugiura | 179/100.2 S |
| 3,705,271 | 12/1972 | de Bell et al. | 35/100.2 MD |

*Primary Examiner*—Alfred H. Eddleman
*Attorney, Agent, or Firm*—Jacobs & Jacobs

[57] ABSTRACT

Sound reproducing apparatus for providing a continuous program of intelligence recorded on a record medium such as magnetic tape. A control signal is recorded on the tape in addition to the intelligence-carrying signal. The recorded program is reproduced by a device which is maintained in the operative state, provided that the control signal and the intelligence-carrying signal are not interrupted longer than a predetermined time interval. When the control signal and the intelligence-carrying signal are absent longer than this predetermined time interval, the reproducing device is rendered inoperative.

5 Claims, 6 Drawing Figures

SOUND REPRODUCING APPARATUS IN WHICH THE DRIVE MEANS OPERATES IN RESPONSE TO A PRERECORDED CONTROL SIGNAL

BACKGROUND OF THE INVENTION

The present invention relates to sound-reproducing apparatus. More particularly, the invention relates to sound-reproducing apparatus for providing a continuous program of intelligence from a record medium, a sound-reproducing circuit arrangement, and a method of recording the presence or absence of a control signal with intelligence recorded on a record medium.

A program of intelligence recorded on a record medium may be for the purpose of instruction in a mechanical enterprise, such as for example, home repair, language lessons, automobile repair, appliance repair, appliance construction, body exercise, cooking and so on. Thus, for example, if an instructee plays out a record medium having a program recorded thereon for instruction in building a wooden bookcase, he may hear an instruction to select a pine board of specified dimensions. This instruction will require a time interval sufficient to enable the listener to select the described board. This will then be followed by the next instruction which may be to cut the board to a specified length and sand or smooth its edges. An interval sufficient to permit the instructee to cut and sand the board will then be needed. These time intervals are provided by the present invention by causing the tape player to shut down automatically at the end of each instruction. When the instructee completes the specified task, the player is reactivated by the instructee to reproduce the next instruction. In this way, the tape need not contain several "dead spaces" which would be a waste of tape.

In the present invention, furthermore, the instructee can take the time he actually requires to perform the task. He is not dependent on a specific time programmed on the tape. Excess waiting intervals are thereby eliminated, as are situations in which the tape starts on another instruction before the instructee is ready for it.

It is desirable that the sound-reproducing apparatus be capable of being maintained in the operative state during voice pauses of any length, particularly those inherent in the voice or delivery of the instructor while issuing instructions to the student. For certain specific pauses, however, such as needed to follow an instruction, it is desirable to switch off the apparatus or render the sound-reproducing apparatus inoperative.

The principal object of the present invention is to provide sound-reproducing apparatus for providing a continuous program of intelligence from a record medium for maintaining readout during the program independent of pauses within the program, and for terminating readout upon the true termination of the program, with efficiency, effectiveness and reliability.

An object of the present invention is to provide a sound-reproducing circuit arrangement for reproducing a continuous program of intelligence from a record medium for maintaining reproduction capability during the program, independent of pauses within the program, and for terminating reproduction capability upon the true termination of the program, with efficiency, effectiveness and reliability.

Another object of the invention is to provide a method of recording a control signal with intelligence recorded on a record medium with interruptions for predetermined periods of time at predetermined places, efficiently, effectively and reliably.

Still another object of the present invention is to provide a method of reproducing a continuous program of intelligence recorded on a record medium which maintains reproduction of the program during the program, independent of pauses within the program, and terminates reproduction upon the true termination of the program, with efficiency, effectiveness and reliability.

BRIEF SUMMARY OF THE INVENTION

In accordance with the present invention, a control signal is recorded on the record medium, in addition to the intelligence-carrying signal. This control signal is of preferably 50 Hz and has a level preferably 14 db below the maximum program signal level. When reading out the record medium, the control signal is amplified and applied to a bistable circuit which maintains power applied to the operative elements of the sound-reproducing apparatus. Provided that the control signal is not interrupted longer than a predetermined interval, power to the operative elements of the apparatus is maintained by the bistable circuit, and the apparatus is held in the operative state. When, on the other hand, the control signal and the intelligence-carrying signal both remain absent longer than this predetermined interval, power to the operative elements of the apparatus is interrupted, and the sound-reproducing apparatus is switched off or rendered inoperative. With this arrangement, the sound-reproducing apparatus is retained in the operative state, during pauses of any duration in the intelligence-carrying signal, so long as the control signal continues on the record medium.

The record medium as, for example, magnetic tape, is driven by a motor operated accurately at constant speed by a control circuit, in accordance with the present invention. A reference voltage supply serves as the basis for maintaining the motor speed substantially constant. The motor driving the record medium or magnetic tape, may also be operated in a fast forward mode through a circuit having a bistable multivibrator which permits the motor to be driven in this fast mode without requiring that the user of the apparatus maintain a control button, for example, in the depressed state.

BRIEF DESCRIPTION OF THE DRAWINGS

In order that the present invention may be readily carried into effect, it will now be described with reference to the accompanying drawings, wherein.

DETAILED DESCRIPTION OF THE INVENTION

Figure 1:
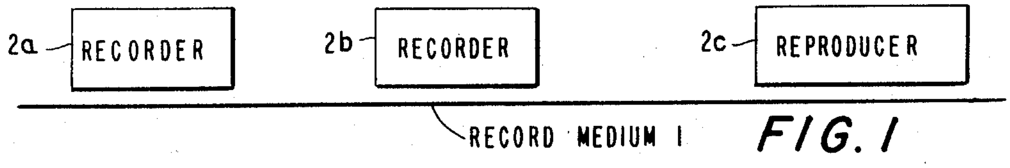
FIG. 1 is a block diagram of the apparatus used for recording intelligence and a background signal on a record medium, and reproducing the recorded intelligence and background signals in accordance with the present invention.

In accordance with a preferred embodiment of the present invention, a recorder 2*a* records a continuous program of intelligence on a record medium 1 (FIG. 1). After recorder 2*a* has recorded the desired program, a recorder 2*b* is used to record a background signal on the tape 1. Preferably it is possible simultaneously to record the desired program and control signal. The reproducing device includes a reproduction control device, hereinafter described, in operative proximity with the record medium for de-energizing the reproducing device 2*c* upon the detection of the interruption of the control signal for a predetermined period of time.

The control signal is preferably a 50 Hz signal and is preferably 14 db below the maximum program signal level.

Figure 2:
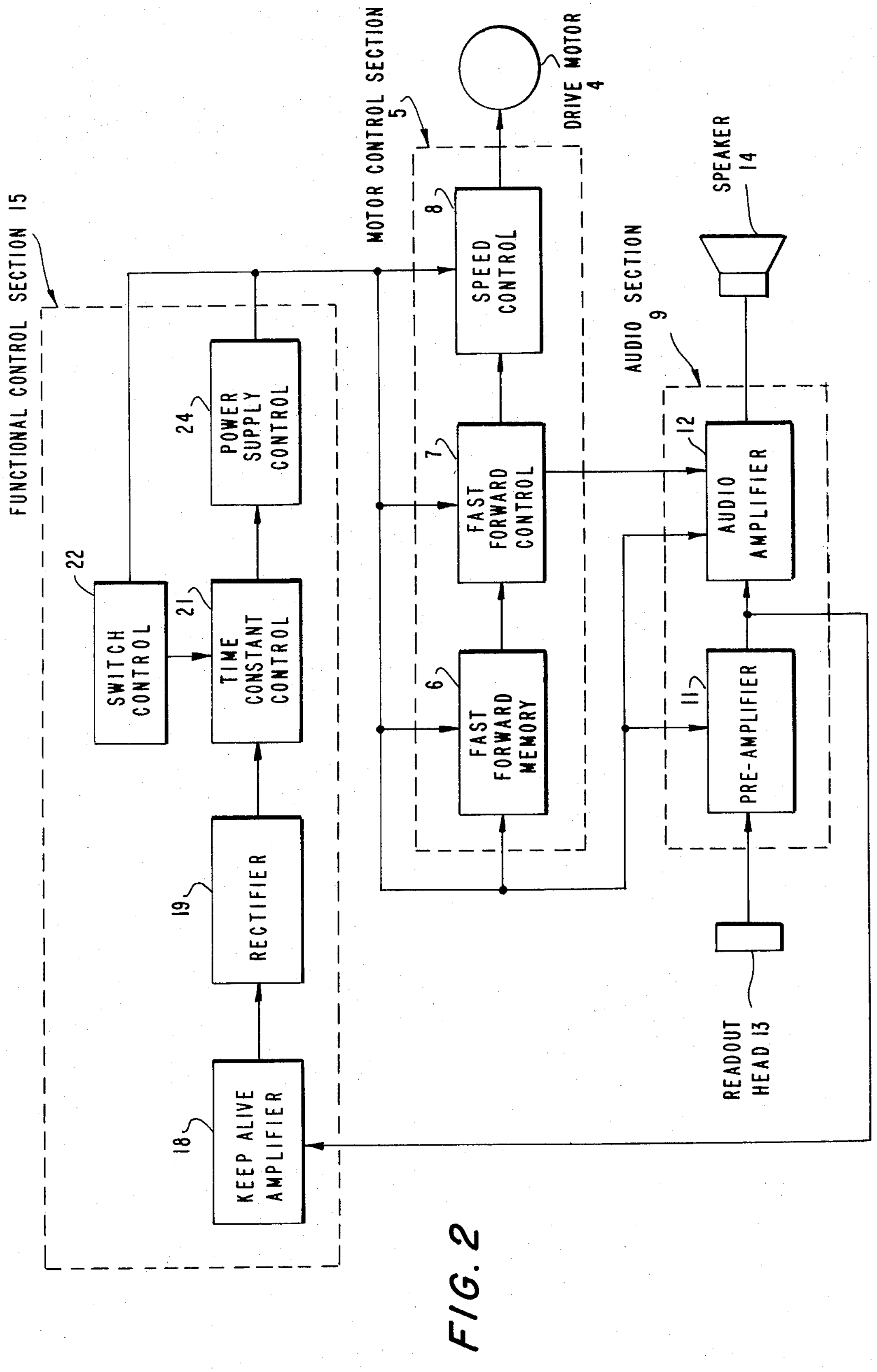
FIG. 2 is a block diagram of an embodiment of the sound-reproducing circuit arrangement of the present invention.

The reproducing device 2*c* may include the sound-reproducing circuit arrangement of FIG. 2. In accordance with the present invention, the sound-reproducing circuit arrangement comprises a motor 4 for driving the record medium 1 (FIG. 1). A motor control section 5 comprises a fast forward memory 6, a fast forward control 7, and a speed control 8 (FIG. 2) connected to the motor 4 for operating and controlling the motor.

An audio section 9 (FIG. 2) reads out the program recorded on the record medium 1 (FIG. 1) and reproduces the sound. The aduio section 9 comprises a preamplifier 11 and an audio amplifier 12 (FIG. 2). A readout head 13 is connected to the input of the preamplifier 11. The input of the audio amplifier 12 is connected to the output of the preamplifier 11, and the output of the audio amplifier is connected to a speaker 14.

A functional control section 15 is connected to the audio section 9, as well as to the motor control section 5. The functional control section 15 de-energizes the motor 4, the motor control section 5, and the audio section 9, when the audio section detects an interruption in the control signal and the intelligence-carrying signal for the predetermined period of time.

The fast forward control 7, described in detail with reference to FIG. 4, rotates the motor at a rapid forward rate and includes a conventional mute signal device which produces a mute signal when actuated. The audio amplifier 12 is connected to the mute signal device and is muted when the fast forward control 7 is actuated.

The functional control section 15 has a keep alive amplifier 18 with input connected to the preamplifier 11. The output of the keep alive amplifier 18 is connected, through a rectifier 19, to a time constant control 21. A switch control unit 22 is also connected to the time constant control 21. The output of the time constant control 21 is connected to the input of a power supply control 24.

The power supply control 24 has an output connected to the switch control 22, the speed control 8, the fast forward control 7, the fast forward memory 6, the audio amplifier 12 and the preamplifier 11. Thus, the power supply control provides power to and energizes each of these units.

In the first operation of the manually operable switch control 22 to its ON position, the motor 4 becomes energized and remains energized for a predetermined time interval determined by the time constant control 21. Upon subsequent operation of the switch control 22, the power supply is disconnected from the motor 4, and the motor control section 5 as well as the audio section 9.

In the absence of the control signal and the intelligence-carrying signal on the record medium 1 for a period in excess of the predetermined time interval, the power supply 24 is disconnected to de-energize the motor 4, the motor control section 5 and the audio section 9. The audio amplifier 12 is connected to the fast forward control 7, and the audio amplifier is de-energized when the fast forward control is actuated by conventional means (not shown).

Figure 3:
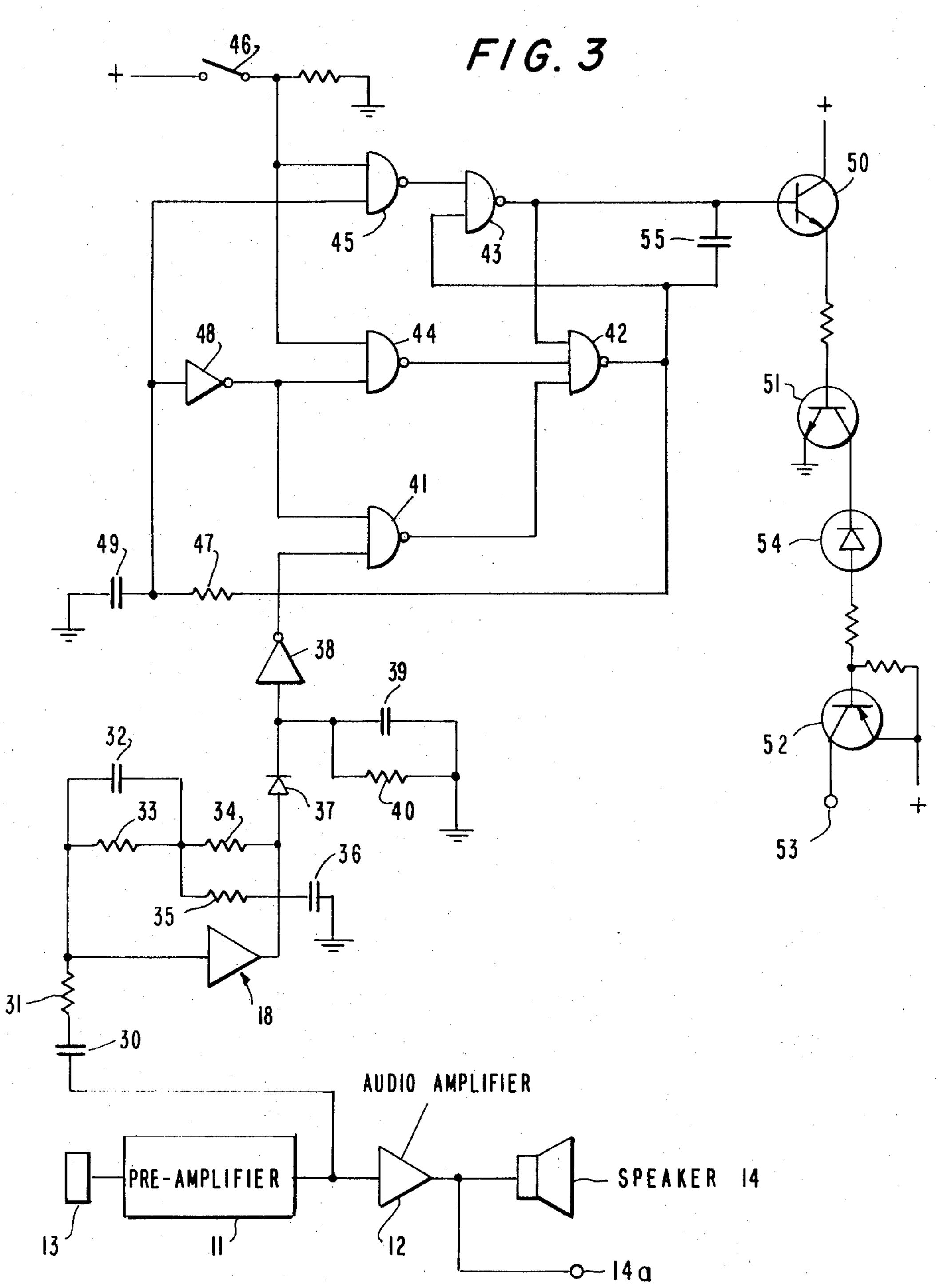
FIG. 3 is a circuit diagram of the arrangement for reproducing the background signal and supplying power to the operative elements of the reproducing apparatus for as long as the background signal is not interrupted longer than a predetermined interval.

Referring to FIG. 3 for the circuit details of the functional control section 15, the control signal obtained at the output of the preamplifier 11 is applied to the keep alive amplifier 18, through the input RC network comprised of capacitor 30 and resistor 31. The keep alive amplifier 18 is an operational amplifier with feedback branch comprised of the capacitor 32, resistors 33 and 34, and the series RC circuit of resistor 35 and capacitor 36. The feedback network serves to eliminate most of the voice signal components of the intelligence-carrying signal, e.g. above about 300 Hz or so, but enough remains so that the intelligence-carrying signal must be interrupted during the period of interruption of the control signal to ensure that there will be no signal at all supplied to inverter 38 when it is desired to switch the device to the inoperative state. The operational amplifier 18 serves to amplify the control signal obtained from the preamplifier 11 and to apply the amplified control signal to a rectifier 37. Operational amplifiers together with their input-output and feedback networks are highly developed and well known in the art, and are for this reason not further described here.

The rectifier 37 passes only the positive portions of the control signal after amplification by the keep alive amplifier 18, and this positive signal is applied to an inverter 38 after the rectified signal is smoothed by the RC network of the capacitor 39 in parallel with the resistor 40. The output of the inverter 38 is applied to an input of a NAND gate 41. The output of the gate 41 is applied to a further gate 42, the output of which is applied to one input of the gate 43. Gates 42 and 43 are interconnected to function in combination as a flip flop. The output of the gate 43 is thereby connected to a second input of the gate 42.

A third input to the gate 42 is derived from the output of the gate 44. One input of this gate 44 is connected to both a gate 45 and a switch 46 which is of the momentary actuated type. The output of the gate 42 is connected, through a resistor 47, to an inverter 48. The output of the inverter 48 is applied to both an input of the gate 44 and the gate 41. A capacitor 49, connected to the resistor 47, forms an RC time delay circuit with this resistor. The aforementioned gates are of the NAND type and are of the CMOS construction, as are the inverters 38 and 48. The use of these types of gates and inverters are preferred in the present invention because of their low power requirements which make it possible to maintain the gate circuits continuously connected to a battery supply without excessive drainage of the battery. In the NAND gates above, the output signal is at a low level when all input signals have a high level. When any input of these gates has a low signal level applied to it, the output of the respective gate has a high signal level.

When the push button switch 46 is momentarily actuated a first time, there is a change in state of the flip flop comprised of gates 42 and 43. This change in state of the flip flop corresponds to the ON state for which the output of the flip flop at the NAND gate 42 output is at low signal level. The flip flop may be reset subsequently by again pressing the momentary actuated switch 46 a second time. When thus reset, the output of the flip flop returns to a high signal level. After setting the flip flop, it is essential to allow a time interval, determined by the RC network 47, 49, before resetting the flip flop.

In the ON state of the flip flop, the low output signal level is converted to a high signal level by the inverter 48 after the time delay determined by the RC network 47, 49. The output signal level of the flip flop corresponds to the output of the gate 42 which is applied to the inverter 48, through the resistor 47.

The high level output of the inverter 48 is applied to one input of the gate 44. When the other input of the gate 44 also acquires a high signal level as a result of actuation of the switch 46, the output of the gate 44 attains a low signal level which serves to reset the flip flop to the OFF state.

When the flip flop is in the OFF state, and the push button switch 46 is momentarily actuated a first time, the input of gate 45 connected to the switch 46 has a high signal level applied to it. The other input of the gate 45 also has a high level signal applied to it, since the output of the flip flop or output of gate 42 is at a high level when the flip flop is in the OFF state, as already described above. With the two inputs of the gate 45 at high level thereby, the output of this gate 45 serves to set and change the state of the flip flop to the ON state. Thus, gate 45 serves to set the flip flop to the ON state, whereas gate 44 serves to reset the flip flop to its OFF state.

From the description above, it is noted that the flip flop may be set to the ON state even though there is no control signal available from the record medium 1, as detected by the preamplifier 11 and amplified by the keep alive amplifier 18. If, however, such control signal does not appear within the time interval determined by the RC network 47, 49, the flip flop will be reset to the OFF state. This time delay is needed to take into account the possibility that the tape might be started at the beginning of a portion of the tape where there was a predetermined absence of the recorded intelligence and the control signal. In such a case, the machine could be turned on by switch 46 and then turned off by the absence of a control signal. Thus, the RC network comprised of resistor 47 and capacitor 49 functions as a time delay circuit which remembers the OFF state of the flip flop, in which state the output of the flip flop corresponding to the output of gate 42 is at a high level. This high level is remembered by the RC network 47, 49 and applied to the gate 45 for setting the flip flop to the ON state when a signal is applied to the other input of the gate 45 by the switch 46. The input to the gate 45 from the RC network 47, 49 will remain at a high level for an interval determined by the time constant of this RC network. If within this interval no control signal is amplified and applied to the inverter 48, the flip flop will be reset to the OFF state, since if the output of inverter 48 attains a high level before the output of inverter 38 attains a low level, then both of these signals, applied as the two inputs to gate 41, will be simultaneously at high level. As a result, the output of gate 41 will be at low level and will activate gate 42 to a high output level, thereby resetting the flip flop.

The output of gate 41 is at a high level in the OFF state of the flip flop. After setting the flip flop to the ON state by the momentary contact switch 46, the output of gate 41 would become low and thereby reset the flip flop to the OFF state, unless the input to the gate 41 connected to the output of the inverter 38 becomes low before the expiration of the time interval determined by the RC network 47, 49. This input to the gate 41 becomes low thereby when there is a control signal detected on the record medium 1 by the preamplifier 11 and amplified by the keep alive amplifier 18. The inverter 38 serves to convert the high level of the output of the keep alive amplifier 18 to the low level applied to the gate 41.

When no control signal is detected by the preamplifier 11 and applied to the inverter 38 through the keep alive amplifier 18, the output of the inverter 38 is at a high level. Since in the operating mode of the flip flop, the other input of gate 41 connected to the output of inverter 48 is also at a high level, the output of gate 41 becomes a low and thereby resets the flip flop to the OFF state.

In the ON state of the flip flop, the signal from the gate 43 output from the flip flop is amplified by current amplifiers 50, 51 and 52, and applied to the output terminal 53. This terminal 53 serves as the power supply for the remaining functional elements of the sound reproducing arrangement, in accordance with the present invention. A light emitting diode 54 serves to indicate whenever the flip flop is in the ON state. A capacitor 55 is provided to suppress accidental actuation of the flip flop by stray electromagnetic signals. The current amplifiers 50, 51 and 52 serve to provide sufficient current for operating the motor, the fast forward memory and control, and the audio section.

Figure 4:
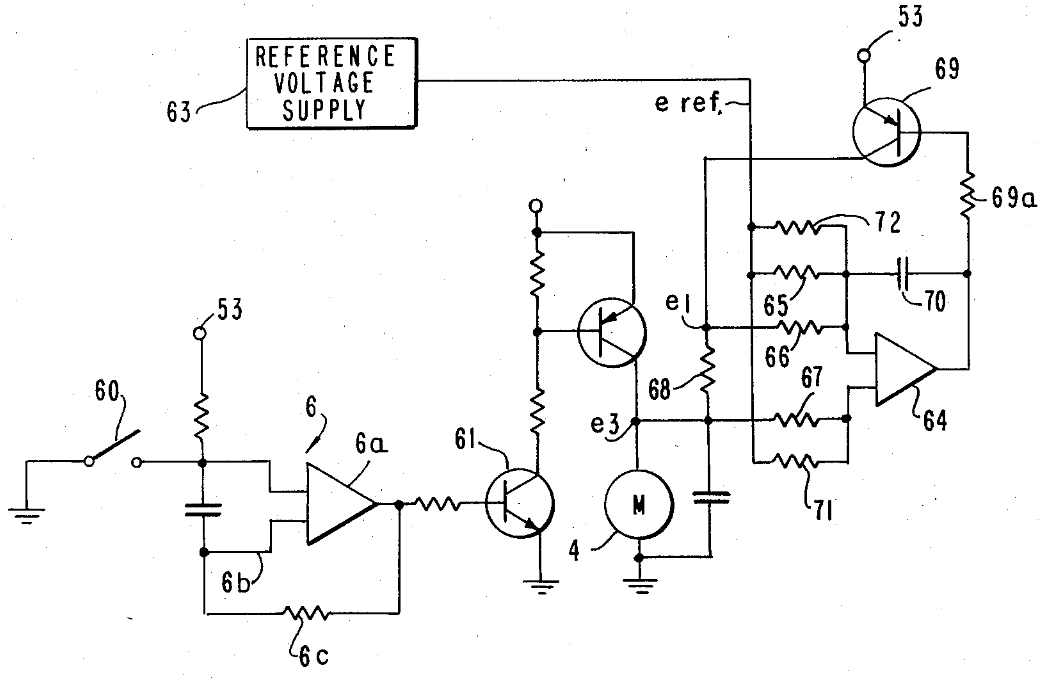
FIG. 4 is a circuit diagram of an embodiment of the control circuit for the motor used to drive the recrod medium.

FIG. 4 provides the circuit details of the motor control section 5 (FIG. 2). To operate the motor 4 in the fast forward mode, a switch 60 of the momentary contact type is depressed. The switch 60 is connected to an operational amplifier 6a which is interconnected to form a bistable multivibrator circuit 6. The amplifier 6*a* is known in the art as a Norton amplifier. This amplifier is designed to obtain the differences of input currents rather than differences of input voltages as in conventional operational amplifiers. Instead of using a standard transistor differential amplifier at the input in the Norton amplifier, the non-inverting input function is achieved by making use of a "current-mirror" to "mirror" the non-inverting input current above ground and then to extract this current from that which is entering the inverting input terminal. The upper input terminal of the amplifier is the inverting one, whereas the lower input terminal is the non-inverting input. Such Norton amplifiers are commercially available. Upon applying ground potential to the bistable multivibrator 6, through the switch 60, the output of this bistable multivibrator becomes high, corresponding to the high level applied to the terminal 53. The terminal 53 serves as the supply voltage, as discussed above. With the output of the multivibrator 6 at a high level, the input 6*b* is also at a high level as a result of the feedback path 6*c*. With this arrangement, the bistable multivibrator 6*a* remains in the ON state, even though the momentary contact switch 60 is released. The output of the bistable multivibrator 6*a* is amplified by current amplifiers 61 and 62, so that the motor 4 has applied to it the voltage level of terminal 53 with sufficient current to drive the motor at a substantial rapid rate in the forward direction.

The time constant of the RC network 39, 40 (FIG. 3) retains the machine in the operative state for a predetermined time interval, even though no control signal is detected by the keep alive amplifier during this interval. Should no control signal be detected after that time interval, the machine becomes inoperative due to the resetting of the flip flop to the OFF state whereby the operating power for the motor and audio section is no longer available at the terminal 53. Consequently, if it is desired to introduce a programmed stop on the record medium or tape during normal feed of the tape, it is essential to omit the control signal and recorded intelligence for a period of time at least equal to the time interval determined by the time constant of RC network 39, 40.

To stop the tape in fast forward feed of the tape, it is possible to provide a sufficiently long length of tape from which the control signal and recorded intelligence are absent such that even at fast forward feeds of, say, 15 times normal, the control signal and recorded intelligence will nevertheless be absent for a period of time at least equal to the time constant of the RC network 39, 40. Thus, if the time constant is 200 milliseconds, then the length (in inches) of tape from which there is the desired absence of signal sufficient to cause a shutdown at fast forward feed would be a distance of at least (200 milliseconds × 15) times the speed (in inches per second) of the tape at normal feed. Such a long gap would be effective to cause shutdown at either fast or normal feed.

Figure 5:
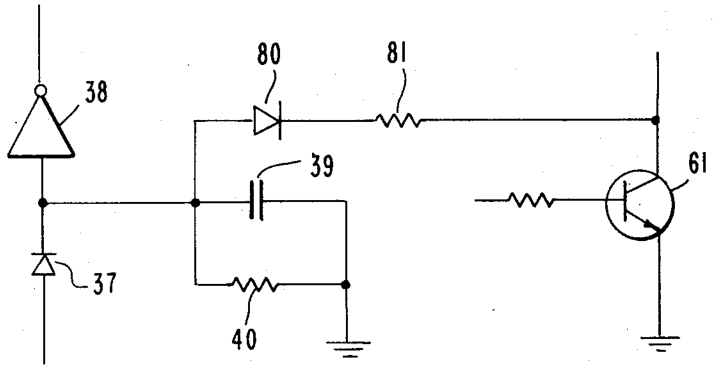
FIG. 5 is a circuit diagram of a further embodiment of the arrangement of the FIG. 4.

Alternatively, shutdown at fast forward feed can be effected by reducing the time constant of network 39, 40 during the fast forward mode. Such reduction in the time constant of the network 39, 40 may be achieved through the arrangement shown in FIG. 5. In this arrangement, a diode 80 and a series-connected resistor 81 are inserted between the collector of transistor 61 in FIG. 4 and the input to inverter 38 in FIG. 3 in the fast forward mode. When not in fast forward mode, the diode 80 is back-biased, since the transistor 61 is cut off and its collector potential essentially that of terminal 53 (FIG. 4). In fast forward mode, however, transistor 61 is turned on and its collector potential becomes essentially ground, thereby inserting resistor 81 in series with diode 80 and effectively in parallel with resistor 40. By reducing the time constant of the RC network 39, 40 in this manner, the length of tape without control signal required for shutdown need not be longer than that required for shutdown during normal feed.

To operate the motor 4 at constant speed when reading out intelligence from the record medium 1, a reference voltage supply 63 is provided which is independent of decreasing voltage due to aging in the battery supply, preferably used as the source of power for the sound reproducing apparatus. The output of the reference voltage supply 63 is applied to one input of an amplifier 64. Also connected to the inputs of the amplifier 64 are the motor voltage and the collector of a transistor 69 with base connected to the output of the amplifier 64 via resistor 69*a*. Amplifier 64 is a Norton amplifier which functions in accordance with the description given in relation to amplifier 6*a*.

The circuit arrangement of the amplifier 64, together with its inputs and output, is used to implement the following equation:

$$e_1/2 + e_{ref} = e_3$$

The voltage potentials in this equation correspond to those present at the circuit locations identified correspondingly in FIG. 4. The preceding equation is implemented for the purpose of maintaining constant the back emf of the motor. Thus, by maintaining constant the back emf of the motor, the speed of the motor is also held constant. To implement the equation, the resistor 68 is made substantially equal to the internal resistance of the motor. At the same time, the magnitude of the resistance 66 is twice that of resistances 65 and 67. Resistors 71 and 72 are current bias resistors of equal magnitude. From the circuit arrangement of FIG. 4, the following two relationships may be obtained:

$$e_1 = e_b + 2i_m r_m$$

$$e_3 = e_b + i_m r_m$$

where $r_m$ is the internal resistance of the motor and $i_m$ is the current through the motor. The back emf of the motor is designated by $e_b$. When the immediately preceding two equations are substituted into the first equation, one obtains the relationship that the back emf is equal to twice the reference voltage. Accordingly, with the circuit arrangement of FIG. 4, the back emf is held substantially constant since it is proportional directly to the reference voltage as supplied by the unit 63. With the motor speed thus held constant, the speed of the record medium 1 is also maintained constant.

The control signal is preferably a 50 Hz signal since at frequencies of that order for small speakers, the listener will not bear the signal. For systems with speakers whose low frequency response extends down to 50 or 60 Hz, the control signal can be 15 to 20 Hz. The output of the audio amplifier 12 may be applied to a speaker 14 and/or an audio receiving element 14*a*, which may be directly inserted into the ear of the listener. The change in state of the signal level at the output of gate 41 may furthermore be used for the purpose of changing the state of operation of auxiliary equipment or appliances used in conjunction with the sound reproducer of the present invention. Thus, this change in state of the signal level at the output of gate 41 may be used, for example, to actuate a slide projector for the purpose of changing slides, to switch on cameras, or to energize automatic equipment and remote control elements. The use of the absence of the control signal in this manner has a significant advantage over the use of the presence of an auxiliary tone, since an auxiliary tone would be dependent on tape speed, whereas the method in accordance with the present invention is not dependent on tape speed. The use of an auxiliary tone would require a trap or tuned circuit, and therefore changing the tape speed, as in going from normal to fast forward, would then require changing the frequency of the trap. This, in turn, would require that the tape speed in fast forward would have to be controlled. The present invention avoids these problems by providing a system that does not require any precise control over tape speed in fast forward, merely detection of the absence of a control signal. Since this system is not tied to a specific tape speed in fast forward, the present invention can obtain fast forward merely by directly connecting the motor to the power source, e.g. a battery. If a battery is used, then the fast forward tape speed will vary from about 12–25 times normal speed for a new battery to 7–9 times normal speed for an old battery. In any case, no compensation or adjustments need be made to take this variation of tape speed into account.

Figure 6:
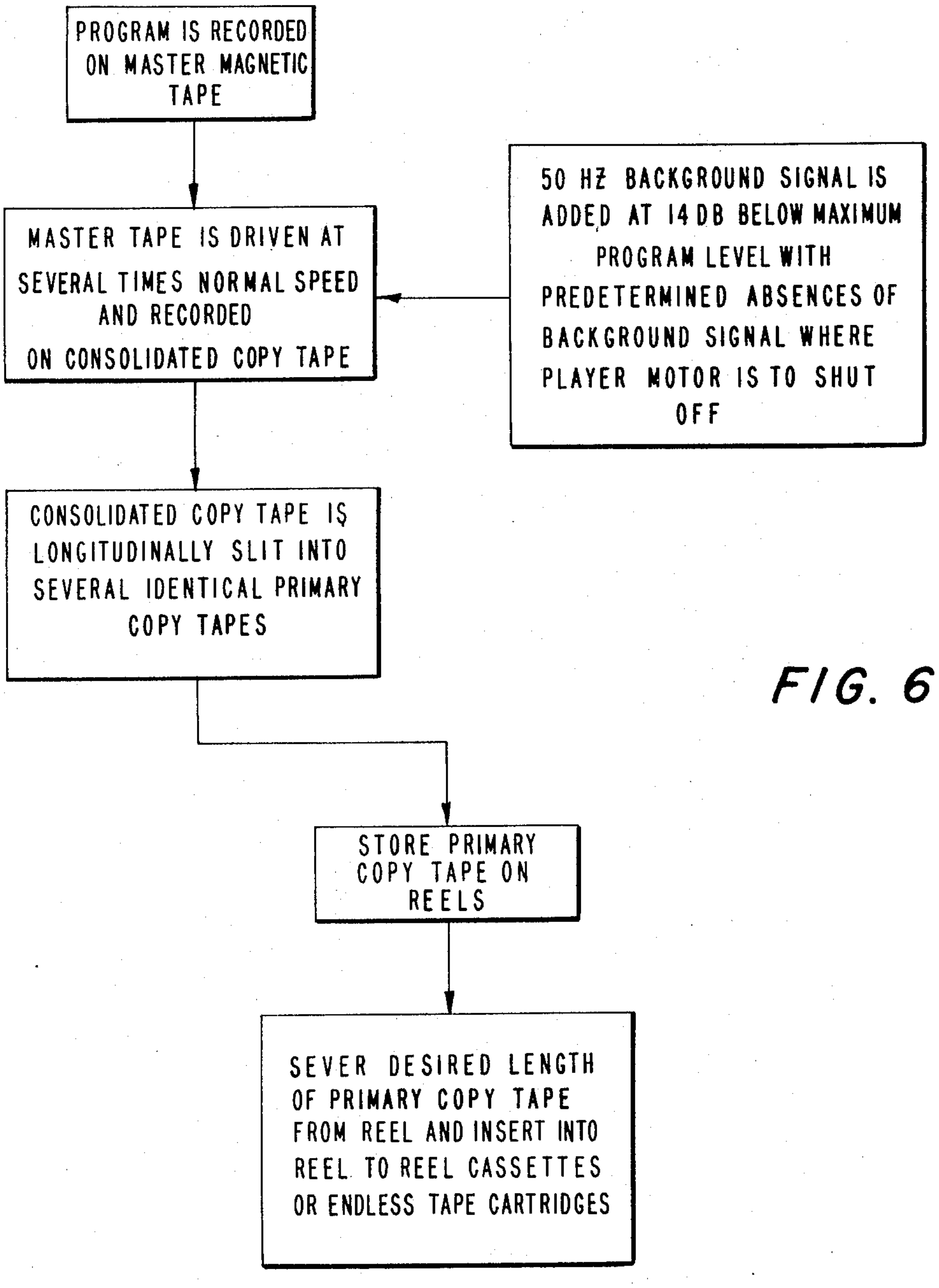
FIG. 6 is a flow sheet illustrating the methods of the invention for recording a control signal, reproducing a continuous program and producing a multiplicity of duplications of a master tape.

The flow sheet of FIG. 6 illustrates the method for producing the record medium 1. As shown by this flow sheet, a 50 Hz control signal is recorded onto magnetic tape in addition to the intelligence which is to be heard by the listener. At those places in the recorded intelligence where it is desired to shut down the motor 4, a gap in the recorded intelligence and in the control signal of predetermined time is programmed. To obtain a multiplicity of duplications of the master tape carrying the intelligence information as well as the background signal, the master tape is driven at a speed which is several times that of the recording speed. The intelligence from the master tape is recorded on a high coercivity, high magnetic energy consolidated copy tape driven at a predetermined speed. The master tape is preferably quarter-inch iron-oxide tape, and is driven at a speed four times that at which it was recorded and the consolidated copy tape is half-inch tape.

The consolidated copy tape is then slit into a plurality of identical separate primary copy tapes. The consolidated copy tape is preferably slit into seven separate primary copy tapes. The separate primary copy tapes are wound on storage reels, from which desired lengths may be severed for use as reel-to-reel or endless tapes. The method and apparatus for obtaining the primary copy tapes from a single consolidated master is described in detail in the copending application of Clark E. Johnson, Jr., Ser. No. 324,221, filed Jan. 16, 1973, entitled "Method and Means for Producing Tape Cassettes and Cartridges," which is hereby incorporated by reference herein.

The recorded master is initially recorded on standard quarter-inch wide iron-oxide tape or record medium with normal NAB equalization and is initially recorded at a speed of either 3¾, 7½ or 15 inches per second. Magnetic tape is then loaded on a recorder which records the entire half-inch of the tape at once. The speed of the tape through the recorder is 1.573 inches per second. The output of the master tape is connected to the input of the recorder and the master tape is run at four times the master tape speed. Thus, if it is recorded at 3¾ inches per second, the master tape runs at 15 inches per second.

The half-inch wide tape is then transferred from the recorder to a slitter on which it is slit into seven identical .071 inches wide or 1.8 mm wide strands. After the tape is slit into 1.8 mm wide strands, the strands are stored on storage reels for subsequent loading of desired segments into reel-to-reel cassettes.

While the invention has been described by means of specific Examples and in specific embodiments, we do not wish to be limited thereto, for obvious modifications will occur to those skilled in the art without departing from the spirit and scope of the invention.

What we claim is:

1. Signal reproduction means for reproducing intelligence signals within a pre-selected frequency range in response to a control signal having a major frequency component outside said range, said signals being recorded on a record medium, comprising:

first detecting means for detecting said control signal;

second detecting means for detecting said intelligence signals;

intelligence signal reproducing means for reproducing said intelligence signals on said record medium; and operating means responsive to said control signal for controlling said intelligence signal means to reproduce said intelligence signals only in continuing response to said control signal.

2. The reproduction means of claim 1, wherein said record medium is magnetic tape.

3. The signal reproduction means of claim 1, wherein there is further included, in combination, a prerecorded record medium having recorded thereon intelligence signals within a pre-selected frequency range and a control signal having a major frequency component outside said range.

4. The signal reproduction means of claim 3, wherein said record medium is a magnetic tape.

5. The signal reproduction means of claim 2, wherein each said signal is recorded across the width of said tape.

* * * * *